(12) United States Patent
Glugla et al.

(10) Patent No.: US 11,530,664 B2
(45) Date of Patent: *Dec. 20, 2022

(54) METHODS AND SYSTEM FOR COLD STARTING AN ENGINE

(71) Applicant: Ford Global Technologies, LLC, Dearborn, MI (US)

(72) Inventors: Chris Paul Glugla, Macomb, MI (US); Garlan J. Huberts, Milford, MI (US); Joseph Thomas, Farmington Hills, MI (US); David Andrew Ord, Woodhaven, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,856

(22) Filed: May 13, 2021

(65) Prior Publication Data

US 2022/0003180 A1 Jan. 6, 2022

Related U.S. Application Data

(63) Continuation of application No. 16/920,846, filed on Jul. 6, 2020, now Pat. No. 11,073,097.

(51) Int. Cl.
| | |
|---|---|
| *F02D 41/06* | (2006.01) |
| *F02D 41/40* | (2006.01) |
| *F02B 19/10* | (2006.01) |
| *F02F 1/24* | (2006.01) |
| *F02B 19/12* | (2006.01) |

(52) U.S. Cl.
CPC ........ *F02D 41/064* (2013.01); *F02B 19/1004* (2013.01); *F02B 19/1023* (2013.01); *F02B 19/1085* (2013.01); *F02B 19/12* (2013.01); *F02D 41/401* (2013.01); *F02F 1/242* (2013.01)

(58) Field of Classification Search
CPC .. F02D 41/064; F02D 41/401; F02B 19/1004; F02B 19/1023; F02B 19/1085; F02B 19/12; F02F 1/242
USPC ................................ 123/491, 267, 260, 263
See application file for complete search history.

(56) References Cited

U.S. PATENT DOCUMENTS

| | | | |
|---|---|---|---|
| 2,884,913 A | 5/1959 | Heintz | |
| 4,075,996 A | 2/1978 | Hisserich | |
| 4,287,862 A * | 9/1981 | Noguchi | ................... F02B 5/00 |
| | | | 123/638 |
| 4,467,759 A | 8/1984 | Artman | |
| 4,483,291 A | 11/1984 | Artman | |
| 4,901,687 A | 2/1990 | Jones | |

(Continued)

FOREIGN PATENT DOCUMENTS

| | | | |
|---|---|---|---|
| CN | 110185534 A | * | 8/2019 |
| EP | 1403511 A1 | | 3/2004 |

(Continued)

*Primary Examiner* — Mahmoud Gimie
(74) *Attorney, Agent, or Firm* — Vincent Mastrogiacomo; McCoy Russell LLP

(57) ABSTRACT

Systems and methods for starting and operating a direct injection engine are described. In one example, the air and fuel are injected into a pre-chamber of a cylinder of an engine while the engine is not rotating. The air and fuel are combusted in the pre-chamber to improve ignition of an air and fuel mixture in the cylinder.

18 Claims, 4 Drawing Sheets

(56) References Cited

U.S. PATENT DOCUMENTS

| | | |
|---|---|---|
| 6,293,095 B1 | 9/2001 | Yamamoto et al. |
| 6,466,670 B1 | 10/2002 | Tsuria et al. |
| 6,782,860 B2 | 8/2004 | Makajima et al. |
| 8,276,564 B2 | 10/2012 | Petruska |
| 8,554,451 B2 | 10/2013 | Tsuji et al. |
| 9,353,674 B2 | 5/2016 | Bunce et al. |
| 10,018,104 B2 | 7/2018 | Grover, Jr. et al. |
| 10,161,296 B2 | 12/2018 | Schock et al. |
| 10,364,738 B2 | 7/2019 | VanDerWege |
| 10,400,696 B2 | 9/2019 | Blaxill et al. |
| 2007/0062476 A1 | 3/2007 | Ota et al. |
| 2012/0118262 A1 | 5/2012 | Johnson |
| 2014/0083391 A1 | 3/2014 | Gruber |
| 2018/0363539 A1* | 12/2018 | Shelby .................. F02B 19/12 |
| 2019/0078498 A1 | 3/2019 | Bedogni et al. |
| 2020/0158005 A1* | 5/2020 | Singh .................... F02M 25/08 |
| 2020/0200068 A1 | 6/2020 | Schock et al. |

FOREIGN PATENT DOCUMENTS

| | | |
|---|---|---|
| EP | 1544456 A2 | 6/2005 |
| JP | 2010144662 A | 7/2010 |

* cited by examiner

METHODS AND SYSTEM FOR COLD STARTING AN ENGINE

CROSS REFERENCE TO RELATED APPLICATIONS

The present application is a continuation of U.S. Non-Provisional patent application Ser. No. 16/920,846, entitled "METHODS AND SYSTEM FOR COLD STARTING AN ENGINE," and filed on Jul. 6, 2020. The entire contents of the above-listed application are hereby incorporated by reference for all purposes.

FIELD

The present description relates to methods and a system for direct starting an engine of a vehicle. The methods and systems may be particularly useful for vehicles that may be directly started.

BACKGROUND AND SUMMARY

A vehicle may be directly started via igniting a mixture of air and fuel that is in a cylinder when rotation of an engine is stopped. In particular, fuel may be injected to a cylinder that holds trapped air while the engine is not rotating. The fuel and air mixture may be ignited and combusted in a cylinder that is on its expansion stroke. The combusted air and fuel mixture may expand to cause the piston in the cylinder to move, thereby rotating the engine's crankshaft to start the engine. By directly starting the engine, it may be possible to assist rotation of the engine via a starter or integrated starter/generator. However, the engine may stop at a location where the amount of air that is trapped in engine cylinders on expansion strokes may be small and it may be difficult to ignite the air-fuel mixture in the cylinder due to the location of a spark plug in the cylinder, lack of charge motion, and cool surfaces within the cylinder. Consequently, combusting an air-fuel mixture in a cylinder that is on its expansion stroke may not generate as much torque as may be desired to rotate the engine. Therefore, it may be desirable to provide an improved way of direct starting an engine.

The inventors herein have recognized the above-mentioned issues and have developed an engine operating method, comprising: injecting air and fuel into a pre-chamber of a cylinder; igniting and combusting the air and fuel in the pre-chamber via a spark plug; and exhausting the combusted air and fuel to the cylinder.

By injecting air and fuel into a pre-chamber and combusting the air-fuel in the pre-chamber, it may be possible to improve combustion of an air-fuel mixture in a cylinder that the pre-chamber is coupled to so that direct starting of an engine may be improved. In addition, by injecting air and fuel into the pre-chamber, it may be possible to generate higher levels of torque via the cylinder so as to improve engine starting.

The present description may provide several advantages. In particular, the approach may improve combustion in a cylinder of an engine that is not rotating so that direct starting of the engine may be improved. In addition, the approach may improve an amount of torque generated via a cylinder of an engine that is direct started. Further, the approach may improve engine starting robustness for directly started engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving direct starting of an engine. The engine may be directly started to reduce reliance on starting the engine via an electric machine. The engine may be of the type shown in FIG. 1 and the engine may include a pre-chamber as shown in detail in FIG. 2. The ignitability of an air-fuel mixture may be improved within the pre-chamber and a combustion flame in the pre-chamber may be directed into a cylinder so that combustion within the cylinder may be improved during direct engine starting. An example engine starting sequence is shown in FIG. 3. The engine starting sequence of FIG. 3 may be provided via the system of FIG. 1 and the method of FIG. 4.

Figure 1:
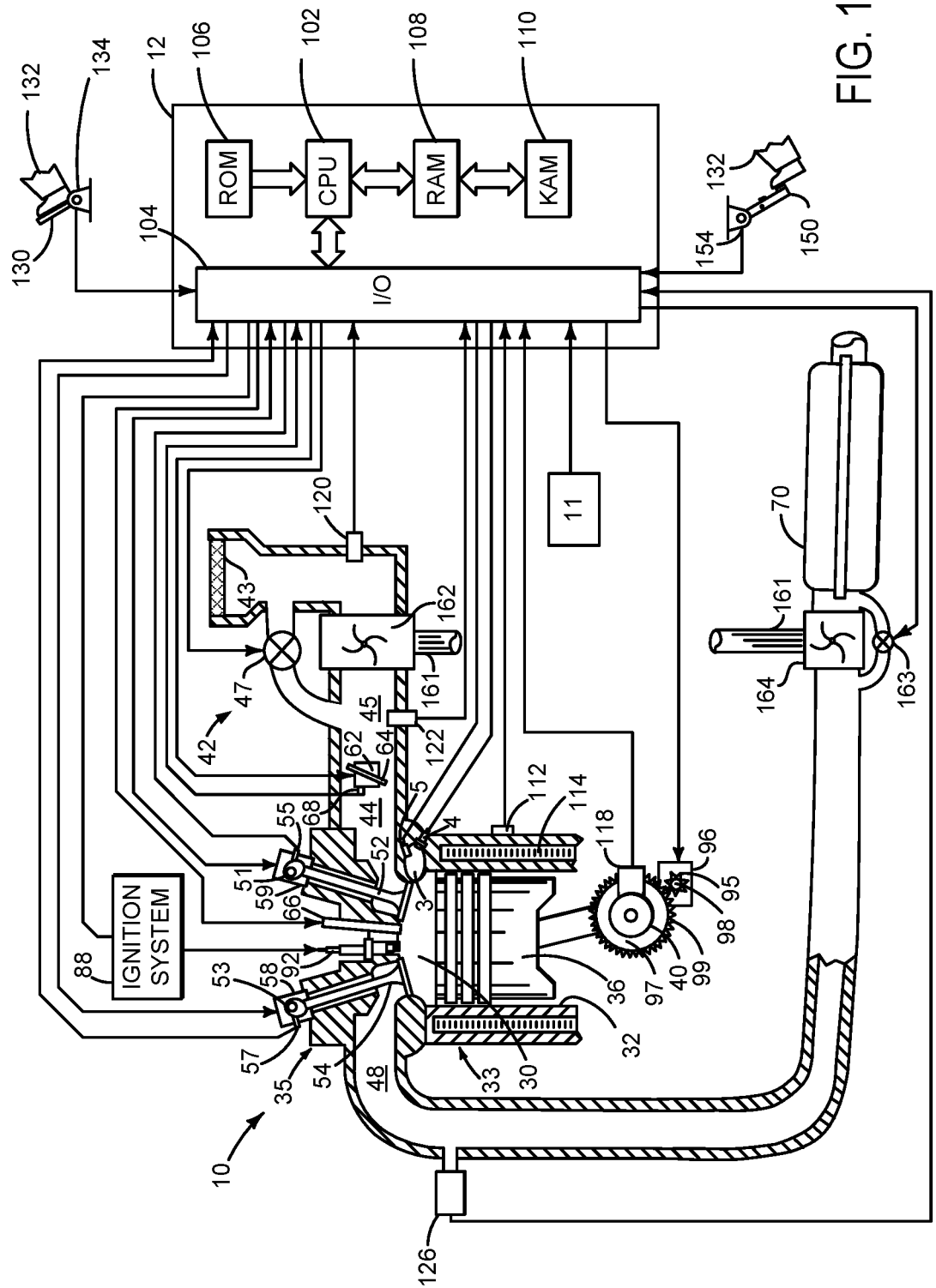
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Combustion chamber 30 may alternatively be referred to as a cylinder. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99 and crankshaft 40. Ring gear 99 is directly coupled to crankshaft 40. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Pre-chamber 3 is shown external to and coupled to combustion chamber 30 and it may receive fuel via pre-chamber fuel injector 4. Pre-chamber 3 also includes a spark plug 5 for generating spark and combusting air-fuel mixtures formed in pre-chamber 3. In some examples, pre-chamber 3 may be incorporated into cylinder head 35.

Fuel injector 66 is shown protruding into combustion chamber 30 and it is positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
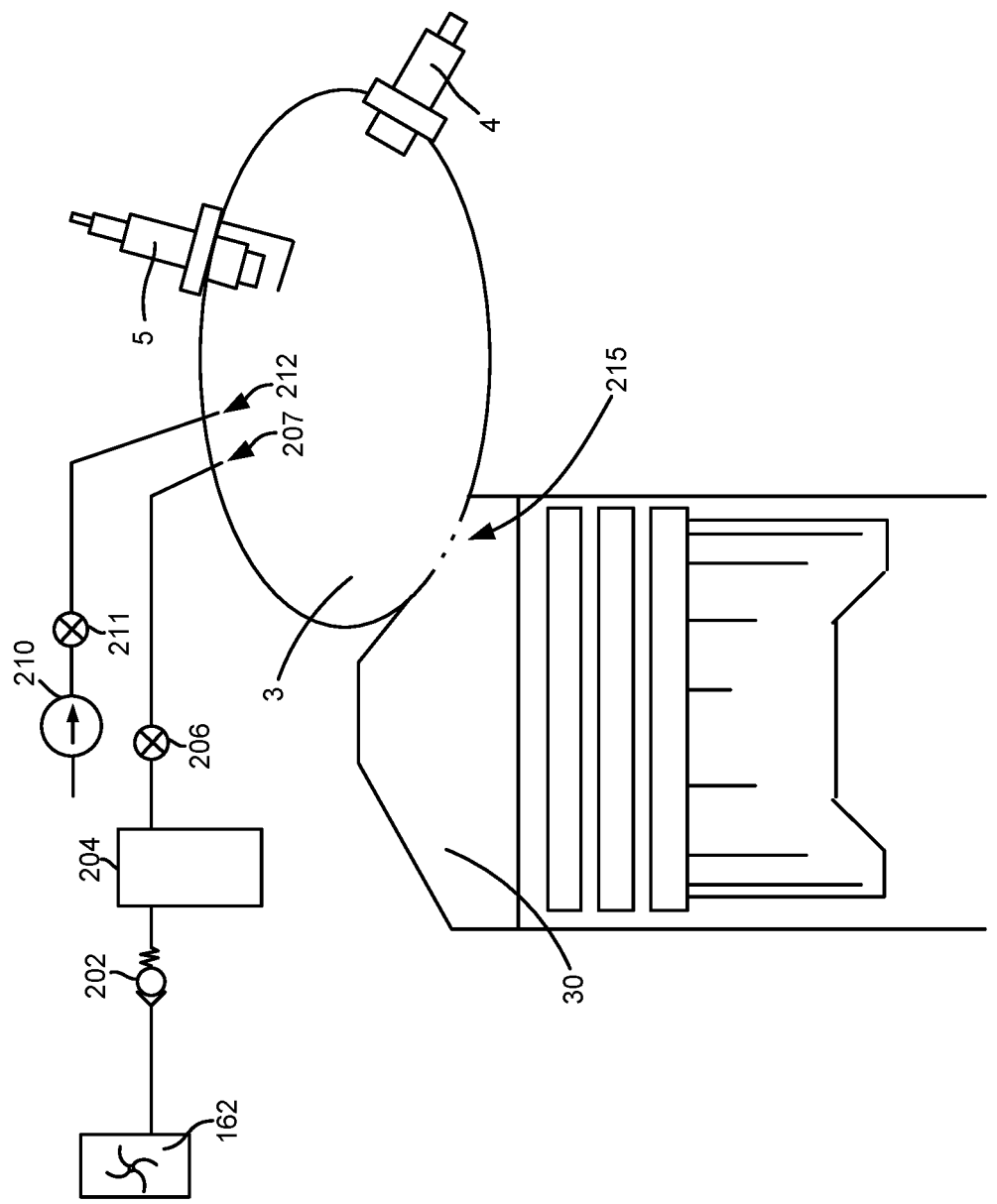
FIG. 2 is a schematic diagram of a cylinder and a pre-chamber that is coupled to the cylinder.
Figure 3:
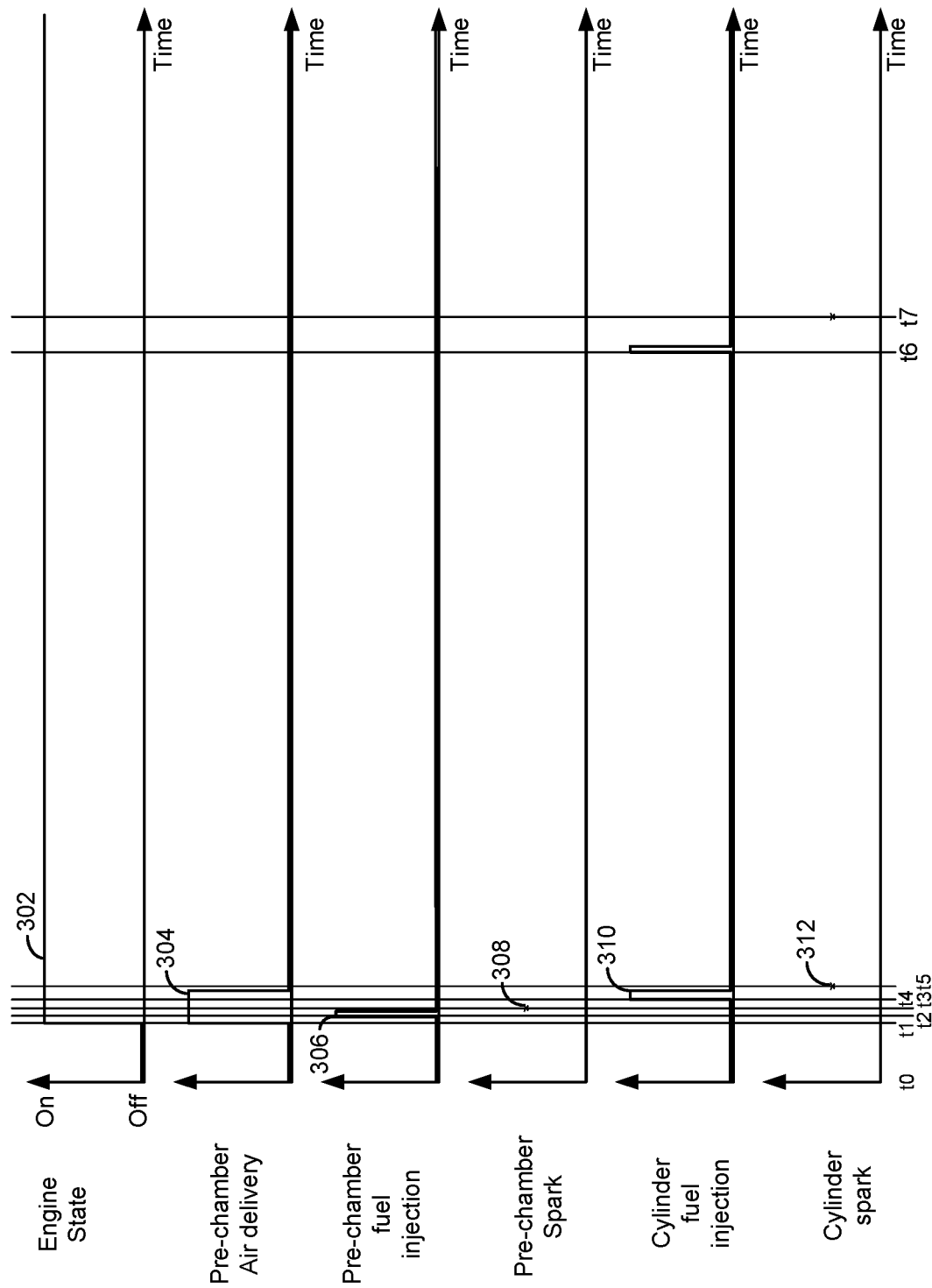
FIG. 3 is an example of an engine starting sequence.

FIG. 2 is a detailed view of pre-chamber 3 and its accompanying components. Pre-chamber 3 includes fuel injector 4 for injecting petrol and a spark plug 5 for generating a spark and combusting an air-fuel mixture within pre-chamber 3. Pressurized air may be supplied to pre-chamber 3 via compressor 162 and reservoir 204. In particular, pressurized air may flow to reservoir 204 via check valve 202. Check valve 202 allows air to flow from compressor 162 to reservoir 204 and it prevents air flow from reservoir 204 to compressor 162. Compressed air may flow from reservoir 204 to air inlet 207 in pre-chamber 3 when pre-chamber air flow control valve 206 is open. Compressed air is prevented from flowing to air inlet 207 when pre-chamber air flow control valve 206 is closed. Alternatively, air pump 210 may supply air to pre-chamber 3 when air pump 210 is activated and when pre-chamber air flow control valve 211 is open.

Pre-chamber also includes jets or ports 215 that may allow gases and flame fronts to pass from pre-chamber 3 to cylinder 30. Gases that may flow into cylinder 30 may include air and combustion by-products.

Thus, the system of FIGS. 1 and 2 provides for a system, comprising: an engine; a cylinder; a pre-chamber coupled to the cylinder, the pre-chamber including a spark plug, a fuel injector, and an air inlet; and a controller including executable instructions stored in non-transitory memory that cause the controller to inject fuel and air into the pre-chamber while the cylinder is on an exhaust stroke in response to a request to start the engine. The system further comprises an air compressor or air pump and an air flow control valve. The system further comprises additional instructions to activate the compressor or air pump in response to the request to start the engine. The system further comprises additional instructions to open the air flow control valve in response to the request to start the engine. The system further comprises additional instructions to inject fuel to the cylinder during the expansion stroke via a fuel injector protruding into the cylinder. The system further comprises additional instructions to combust fuel injected to the cylinder during the expansion stroke. The system further comprises a spark plug protruding into the cylinder.

Referring now to FIG. 3, an example engine starting sequence is shown. The starting sequence of FIG. 3 may be generated via the system of FIGS. 1 and 2 in cooperation with the method of FIG. 4. Vertical lines at times t0-t7 represent times of interest during the sequence. The plots in FIG. 3 are time aligned and occur at the same time. FIG. 3 depicts a starting sequence for one engine cylinder; however, other engine cylinders may be activated similarly. The particular cylinder shown in FIG. 3 is on its expansion stroke at time t0. Other engine cylinders that are on their respective expansion strokes may be activated similarly. Expansion stroke combustion may not be utilized in cylinders that are not on their expansion strokes when the engine is stopped (e.g., when the engine is not rotating as shown at time t0).

The first plot from the top of FIG. 3 is a plot of engine operating state versus time. The vertical axis represents engine operating state and the engine is requested to start or run (e.g., rotate and combust fuel and air) when trace 302 is at a higher level near the vertical axis arrow. The engine is requested to stop or stopped (e.g., not rotating and combusting air and fuel) when trace 302 is at a lower level near the horizontal axis. The horizontal axis represents time and time increases from the left side of the plot to the right side of the plot. Trace 302 represents the engine operating state.

The second plot from the top of FIG. 3 is a plot of the state of air delivery to the cylinder pre-chamber. The vertical axis represents requested the state of air delivery to the cylinder pre-chamber and air is delivered to the pre-chamber when trace 304 is at a higher level near the vertical axis arrow. Air is not delivered to the pre-chamber when trace 304 is at a lower level near the horizontal axis. The horizontal axis represents time and time increases from the left side of the plot to the right side of the plot. Trace 304 represents the state of air delivery to the cylinder.

The third plot from the top of FIG. 3 is a plot of the state of fuel injection to the cylinder pre-chamber. The vertical axis represents requested the state of fuel injection to the cylinder pre-chamber and fuel is injected to the pre-chamber when trace 306 is at a higher level near the vertical axis arrow. Fuel is not injected to the pre-chamber when trace 306 is at a lower level near the horizontal axis. The horizontal axis represents time and time increases from the left side of the plot to the right side of the plot. Trace 306 represents the state of fuel injection to the cylinder pre-chamber via the pre-chamber fuel injector.

The fourth plot from the top of FIG. 3 is a plot of the spark delivery to the cylinder pre-chamber. The vertical axis represents spark delivery to the pre-chamber and spark is delivered to ignite and combust an air-fuel mixture in the pre-chamber when an "*" is shown as indicated at 308. The horizontal axis represents time and time increases from the left side of the plot to the right side of the plot.

The fifth plot from the top of FIG. 3 is a plot of the state of fuel injection to the cylinder. The vertical axis represents requested the state of fuel injection to the cylinder and fuel is injected to the cylinder when trace 310 is at a higher level near the vertical axis arrow. Fuel is not injected to the cylinder when trace 310 is at a lower level near the horizontal axis. The horizontal axis represents time and time increases from the left side of the plot to the right side of the plot. Trace 310 represents the state of fuel injection to the cylinder via the cylinder fuel injector.

The sixth plot from the top of FIG. 3 is a plot of the spark delivery to the cylinder. The vertical axis represents spark delivery to the cylinder and spark is delivered to ignite and combust an air-fuel mixture in the cylinder when an "*" is shown. The horizontal axis represents time and time increases from the left side of the plot to the right side of the plot.

At time t0, the engine state is off to indicate that the engine is not running (e.g., not rotating and not combusting fuel). There is no air delivery to the pre-chamber and fuel is not being injected to the pre-chamber. In addition, spark is not delivered to the pre-chamber and fuel is not injected to the cylinder. Further, spark is not delivered to the cylinder.

At time t1, an engine start is requested and air delivery to the pre-chamber begins. Fuel is not presently injected, but in some examples, fuel injection to the pre-chamber may begin when air delivery to the pre-chamber begins. Spark is not delivered to the pre-chamber at this time. In addition, fuel and spark are not delivered to the cylinder. However, in some examples, fuel delivery to the cylinder may begin when fuel injection to the pre-chamber begins.

At time t2 (e.g., a predetermined amount of time since time t1), fuel injection to the pre-chamber commences. Spark is not delivered to the pre-chamber and fuel injection to the cylinder has not started. In addition, spark is not delivered to the cylinder. Thus, combustion is not present in the cylinder.

Between time t2 and time t3, fuel injection to the pre-chamber ceases. Air continues to be injected to the pre-chamber so that the total amount of air in the cylinder may be increased for the purpose of generating additional torque via the cylinder. However, in some examples, air delivery may cease at the same time fuel delivery to the pre-chamber ceases. Spark is not delivered to the pre-chamber or the cylinder. In addition, fuel is not delivered to the cylinder.

At time t3 (e.g., a second predetermined amount of time since time t1), spark is delivered to the pre-chamber to ignite and combust the air-fuel mixture that is in the pre-chamber. The spark may generate a flame front that causes expansion of gases in the pre-chamber. The flame front may exit the pre-chamber and enter the cylinder through holes or jets between the pre-chamber and the cylinder. By extending the flame front into the cylinder, the possibility of combustion within the engine cylinder may be improved. Air continues to be delivered to the pre-chamber and fuel is not injected to the cylinder. However, in some examples, fuel injection to the cylinder may commence before spark is delivered to the pre-chamber in response to the engine start request. Spark is not delivered to the cylinder.

At time t4, fuel is injected into the cylinder. Temperature within the cylinder is higher since combusted gases pass from the pre-chamber to the cylinder. The higher temperature within the cylinder may promote fuel vaporization and improve combustion of fuel that is injected to the cylinder. Delivery of air to the pre-chamber continues and air flows from the pre-chamber to the cylinder. Fuel is not injected into the pre-chamber and spark is not delivered to the cylinder or the pre-chamber.

Between time t4 and time t5, fuel injection to the cylinder ceases. In addition, air delivery to the pre-chamber ceases and fuel is not injected to the pre-chamber. Spark is not delivered to the cylinder or the pre-chamber. The engine start continues to be requested.

At time t5, spark is delivered to the cylinder at a predetermined time after fuel injection to the cylinder began (e.g., at time t4) in response to the request to start the engine at time t1. The spark ignites the air-fuel mixture that is within the cylinder to expand gases within the cylinder, thereby moving the piston and the engine crankshaft (not shown). The engine start or run request remains asserted and air and fuel delivery to the pre-chamber are suspended. Fuel is not injected to the cylinder.

In some examples, spark may not be delivered to the cylinder while the cylinder that received fuel during is on its expansion stroke. Rather, the flame front from combustion in the pre-chamber may initiate combustion in the cylinder. During such operation, fuel may be injected into the cylinder before the spark is generated in the pre-chamber. The spark in the pre-chamber may cause fuel in the pre-chamber and the cylinder to combust.

Between time t5 and time t6, the engine begins to rotate and accelerate (not shown). The byproducts of the combustion that occurred at time t5 are exhausted and fresh air is inducted into the cylinder that received the fuel at time t4 (not shown). The cylinder into which fuel is injected at time t4 receives fuel a second time at time t6 after it rotates into its intake stroke. Alternatively, fuel may be injected to the cylinder during its compression stroke. In this example, the engine continues running and fuel and air are not delivered to the pre-chamber or the cylinder. However, in other examples, spark, fuel and air may be delivered into pre-chambers of cylinders for a predetermined actual total number of cylinder cycles.

At time t6, fuel is injected to the cylinder. The engine continues to run and air and fuel are not delivered to the cylinder's pre-chamber. In addition, fuel and air are not delivered to the cylinder's pre-chamber. Spark is not delivered to the pre-chamber or the cylinder.

At time t7, spark is delivered to the cylinder a second time since the most recent engine start request at time t1. The spark combusts and air-fuel mixture in the cylinder and the engine continues to accelerate (not shown).

In this way, fuel and air may be combusted in a pre-chamber to improve combustion in a cylinder during engine starting. The combustion of fuel and air in the pre-chamber may initiate combustion within the cylinder that the pre-chamber is coupled to, or alternatively, combustion in the pre-chamber may warm the cylinder's contents to improve fuel vaporization within the cylinder, thereby improving combustion in the cylinder. In addition, air may be added to the cylinder via the pre-charge chamber so that the cylinder may generate a greater amount of torque during direct starting of the engine.

Figure 4:
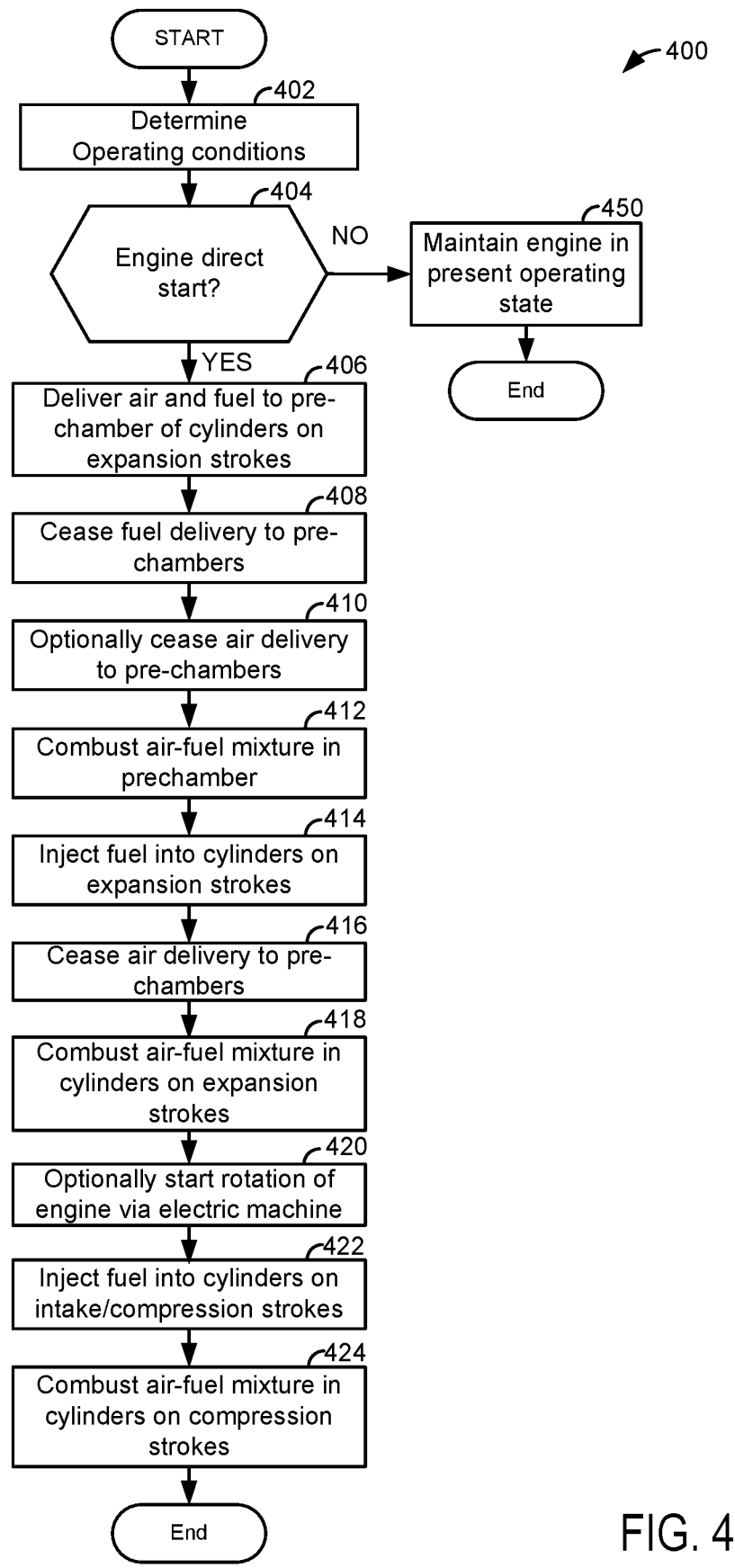
FIG. 4 shows a flowchart of a method for starting an engine.

Referring now to FIG. 4, a flow chart of a method for starting an engine is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines operation conditions. Operating conditions may include but are not limited to ambient temperature, engine temperature, engine speed, barometric pressure, and driver demand torque. Method 400 proceeds to 404.

At 404, method 400 judges if an engine direct start is requested. An engine direct start may be requested via a human providing input to a controller, via a controller, or via a signal from a remote device (e.g., key fob). Further, a direct start may be requested to automatically start the engine. A direct start includes injecting fuel to a cylinder when the engine is stopped and not rotating so that the fuel may be combusted in the cylinder to start or aid in rotation of the engine. In some examples, an electric machine (e.g., a starter or an integrated starter/generator) may also be activated to help rotate the engine when the engine is being direct started. In particular, the electric machine may provide torque to rotate the engine once fuel in an engine cylinder that is on an expansion stroke while the engine is stopped is combusted. If method 400 determines that there is an engine start request, the answer is yes and method 400 proceeds to 406. Otherwise, the answer is no and method 400 proceeds to 450.

At 450, method 400 maintains engine operation in its present state. For example, if the engine is running (e.g., rotating and combusting fuel), the engine continues to run. If the engine is stopped, the engine remains stopped. Method 400 proceeds to exit.

At 406, method 400 delivers air and fuel to the pre-chamber of a cylinder that is on its expansion stroke while the engine is stopped. Air delivery to the pre-chamber may be via a pump or via a compressor as shown in FIG. 2. If the air is delivered via a compressor, it may be stored in a reservoir and pressurized air stored in the reservoir may be released to the pre-chamber via opening a pre-chamber air flow control valve. If the air is delivered via a pump, the pump may be activated and a pre-chamber air flow control valve may be opened to allow the air into the pre-chamber. The fuel may be delivered to the pre-chamber via a pre-chamber fuel injector.

In some examples, fuel may be delivered to the cylinder via a fuel injector that protrudes into the cylinder (e.g., a direct fuel injector) when fuel is injected into the cylinder pre-chamber. The amount of fuel that may be injected may be a function of an amount of air that is stored in the cylinder while the engine is not rotating and the amount of air that is delivered into the cylinder via air flowing from the pre-chamber into the cylinder. If more than one engine cylinder is on its expansion stroke, fuel and air may be delivered to more than one cylinder. Method 400 proceeds to 408.

At 408, method 400 ceases to inject fuel into the cylinder pre-chamber. Method 400 may wait a predetermined amount of time to allow for fuel and air mixing before proceeding to 410. Method 400 proceeds to 410.

At 410, method 400 may cease to supply air to the cylinder pre-chamber so that combustion in the pre-chamber does not get progressively leaner throughout the combustion process. This may ensure that the air-fuel ratio in the cylinder may combust. Alternatively, method 400 may continue to supply air to the cylinder so that combustion gets leaner as time progresses. Additionally, continuing to supply air to the pre-chamber may allow the amount of oxygen in the cylinder to increase so that a greater amount of fuel may be injected to the cylinder and combusted at an air-fuel ratio that generates a greater amount of torque as compared to if only air that was stored in the cylinder participated in combustion. Method 400 proceeds to 412.

At 412, method 400 delivers spark to the cylinder pre-chamber, ignites the air-fuel mixture within the pre-chamber, and combusts the fuel that is in the pre-chamber. In addition, if fuel has been injected into the cylinder, then the fuel that has been injected into the cylinder may be combusted via a flame front that may move from the cylinder pre-chamber into the cylinder via ports or jets that allow flow between the pre-chamber and the cylinder. Method 400 proceeds to 414.

At 414, method 400 injects fuel into the cylinders that are on their expansion strokes (e.g., the same cylinders that received fuel into their pre-chambers). In one example, the amount of fuel that is injected into a cylinder is based on an estimated amount of air that is stored in the cylinder when the engine stopped rotating. However, if air is permitted to flow from the pre-chamber to the cylinder, then the amount of fuel injected to the cylinder may also be adjusted according to the amount of air that entered the cylinder from the cylinder's pre-chamber. In one example, method 400 also adjusts the air-fuel ratio in the cylinder according to engine temperature at the time that the engine start was requested. Method 400 proceeds to 416.

At 416, method 400 ceases flowing air into the cylinder via the pre-chamber if air has been flowing into the cylinder from the pre-chamber. In one example, method 400 closes the pre-chamber air flow control valve to cease air flow into the pre-chamber. By ceasing air flow from the pre-chamber to the cylinder it may be possible to conserve stored air. In addition, metering of air into the cylinder and estimates of cylinder air charge may be improved. Method 400 proceeds to 418 after ceasing air flow into the pre-chambers.

At 418, method 400 delivers spark to the cylinder, ignites the air-fuel mixture within the cylinder, and combusts the fuel that is in the cylinder. However, if fuel was injected to the cylinder while fuel was being injected to the pre-chamber, then fuel in the cylinder may be combusted without providing a spark within the cylinder. Method 400 proceeds to 420.

At 420, method 400 may optionally engage an electric machine to assist rotation of the engine. For example, starter 96 may begin rotating the engine once combustion has been initiated within the engine. Method 400 proceeds to 422.

At 422, method 400 injects fuel into cylinders that are on their intake and/or compression strokes as the engine rotates and accelerates. Further, the injected fuel is combusted via supplying spark to these same cylinders. Injection of fuel and air to cylinder pre-chambers has ceased.

In this way, an engine may be direct started. The direct starting may include supplying spark to the cylinder and the pre-chamber during a first combustion event in a cylinder since a most recent engine start request. Further, the direct starting may include supplying spark to only the pre-chamber during a first combustion event in a cylinder since a most recent engine start request. The pre-chamber may operate to improve combustion within the cylinder, thereby improving engine starting.

In addition, it should be noted that for cylinders that are in their respective compression or exhaust strokes when the engine has stopped rotating, combustion may be initiated in these cylinders via supplying spark, air, and fuel to the pre-chambers of these cylinders so that the engine may be rotated in a first direction and then rotated in a second direction during engine starting (e.g., rocking the engine crankshaft to generate additional torque or to improve a position of a piston in a cylinder that is on its expansion stroke). Alternatively, combustion in the pre-chamber may be provided to improve the crankshaft position for engine starting. Exhaust stroke combustion may be possible and useful if poppet valves of a cylinder may be deactivated in a closed position.

Thus, the method of FIG. 4 provides for an engine operating method, comprising: injecting air and fuel into a pre-chamber of a cylinder; igniting and combusting the air and fuel in the pre-chamber via a spark plug; and exhausting the combusted air and fuel to the cylinder. The method includes where the cylinder is on its expansion stroke. The method includes where the cylinder is in an engine that is not rotating. The method includes where the air and fuel are exhausted to the cylinder via a plurality of jets leading from the pre-chamber to the cylinder. The method includes where the fuel is petrol. The method includes where the injecting air and fuel is in response to a request to automatically start an engine that includes the cylinder. The method includes where igniting and combusting the air and fuel is performed a predetermined amount of time since injecting the air and the fuel.

The method of FIG. 4 also provides for an engine operating method, comprising: injecting air into a pre-chamber of a cylinder and into the cylinder via the pre-chamber; injecting fuel into the pre-chamber after starting to inject air into the pre-chamber; igniting and combusting the air and fuel in the pre-chamber via a spark plug; and exhausting the combusted air and fuel to the cylinder. The method further comprises injecting fuel to the cylinder after injecting fuel into the pre-chamber. The method further comprises injecting fuel to the cylinder while injecting fuel into the pre-chamber. The method further comprises combusting the fuel injected to the cylinder via the igniting and combusting the air and fuel in the pre-chamber. The method includes where combusting of the air and fuel in the pre-chamber is performed during an expansion stroke of the cylinder while an engine that includes the cylinder is not rotating. The method further comprises generating a spark in the cylinder during the expansion stroke while the engine is not rotating.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, or alternative fuel configurations could use the present description to advantage.

The invention claimed is:

1. A method, comprising:
  receiving a request to start an engine; and
  in response to receiving the request to start the engine and while the engine is stopped:
    flowing air from a pre-chamber to a cylinder of the engine on its expansion stroke while the engine is stopped;
    injecting fuel into the cylinder while flowing air from the pre-chamber to the cylinder, wherein an amount of the fuel injected into the cylinder is adjusted according to an amount of the air flowed from the pre-chamber to the cylinder;
    initiating combustion in the cylinder after injecting the fuel into the cylinder; and
    engaging an electric machine to rotate the engine after initiating the combustion in the cylinder.

2. The method of claim 1, wherein flowing the air from the pre-chamber to the cylinder comprises:
  injecting the air into the pre-chamber; and
  flowing the air to the cylinder via holes between the pre-chamber and the cylinder while injecting the air into the pre-chamber.

3. The method of claim 2, further comprising stopping injecting the air into the pre-chamber before initiating the combustion in the cylinder.

4. The method of claim 2, further comprising forming an air-fuel mixture in the pre-chamber by injecting the fuel into the pre-chamber while injecting the air into the pre-chamber.

5. The method of claim 4, further comprising initiating combustion of the air-fuel mixture in the pre-chamber after injecting the fuel into the pre-chamber.

6. The method of claim 5, wherein initiating the combustion of the air-fuel mixture in the pre-chamber comprises generating a spark at a spark plug of the pre-chamber.

7. The method of claim 5, wherein injecting the fuel into the pre-chamber occurs before injecting the fuel into the cylinder, and wherein initiating the combustion of the air-fuel mixture in the pre-chamber occurs before injecting the fuel into the cylinder.

8. The method of claim 7, wherein initiating the combustion in the cylinder comprises generating a spark at a spark plug of the cylinder.

9. The method of claim 5, wherein injecting the fuel into the pre-chamber occurs while injecting the fuel into the cylinder, and wherein initiating the combustion of the air-fuel mixture in the pre-chamber occurs after injecting the fuel into the cylinder.

10. The method of claim 9, wherein initiating the combustion in the cylinder comprises flowing a flame front generated via the combustion of the air-fuel mixture in the pre-chamber to the cylinder via the holes between the pre-chamber and the cylinder.

11. A method, comprising:
  in response to a request to start an engine that is not rotating:
    combusting a first air-fuel mixture in a pre-chamber of a cylinder on its expansion stroke while the engine is not rotating;
    combusting a second air-fuel mixture in the cylinder on its expansion stroke while the engine is not rotating after combusting the first air-fuel mixture in the pre-chamber; and
    providing torque to rotate the engine via an electric machine after combusting the second air-fuel mixture in the cylinder.

12. The method of claim 11, wherein combusting the first air-fuel mixture in the pre-chamber comprises:
  forming the first air-fuel mixture in the pre-chamber by injecting air and fuel into the pre-chamber; and
  igniting the first air-fuel mixture in the pre-chamber via a first spark delivery to the pre-chamber.

13. The method of claim 12, wherein combusting the second air-fuel mixture in the cylinder comprises:
  forming the second air-fuel mixture in the cylinder by injecting fuel into the cylinder before igniting the first air-fuel mixture in the pre-chamber; and
  igniting the second air-fuel mixture via a flame front generated via igniting the first air-fuel mixture in the pre-chamber.

14. The method of claim 12, wherein combusting the second air-fuel mixture in the cylinder comprises:
  forming the second air-fuel mixture in the cylinder by injecting fuel into the cylinder after igniting the first air-fuel mixture in the pre-chamber; and
  igniting the second air-fuel mixture via a second spark delivery to the cylinder.

15. A system, comprising:
  an engine;
  a cylinder;
  a pre-chamber coupled to the cylinder; and
  a controller including executable instructions stored in non-transitory memory that, when executed, cause the controller to:
    ignite a first air-fuel mixture in the pre-chamber while the cylinder is on an expansion stroke in response to a request to start the engine while the engine is stopped;
    ignite a second air-fuel mixture in the cylinder after igniting the first air-fuel mixture in the pre-chamber while the cylinder is on the expansion stroke in response to the request to start the engine while the engine is stopped; and
    provide torque to rotate the engine via an electric machine after combusting the second air-fuel mixture in the cylinder.

16. The system of claim 15, further comprising a first spark plug, a first fuel injector, and an air inlet each directly coupled to the pre-chamber, and wherein to ignite the first air-fuel mixture in the pre-chamber while the cylinder is on the expansion stroke in response to the request to start the engine while the engine is stopped, the controller includes additional instructions that, when executed, cause the controller to:
  inject fuel into the pre-chamber via the first fuel injector while delivering air to the pre-chamber via the air inlet; and
  generate a spark in the pre-chamber via the first spark plug after injecting the fuel and delivering the air to the pre-chamber.

17. The system of claim 16, further comprising a second fuel injector directly coupled to the cylinder, and wherein to ignite the second air-fuel mixture in the cylinder after igniting the first air-fuel mixture in the pre-chamber while the cylinder is on the expansion stroke in response to the request to start the engine while the engine is stopped, the controller includes additional instructions that, when executed, cause the controller to:
  inject the fuel into the cylinder via the second fuel injector before generating the spark in the pre-chamber.

18. The system of claim 16, further comprising a second fuel injector and a second spark plug each directly coupled to the cylinder, and wherein to ignite the second air-fuel mixture in the cylinder after igniting the first air-fuel mixture in the pre-chamber while the cylinder is on the expansion stroke in response to the request to start the engine while the engine is stopped, the controller includes additional instructions that, when executed, cause the controller to:
  inject the fuel into the cylinder via the second fuel injector after generating the spark in the pre-chamber; and
  generate a second spark in the cylinder via the second spark plug after injecting the fuel into the cylinder.

\* \* \* \* \*